UNITED STATES PATENT OFFICE.

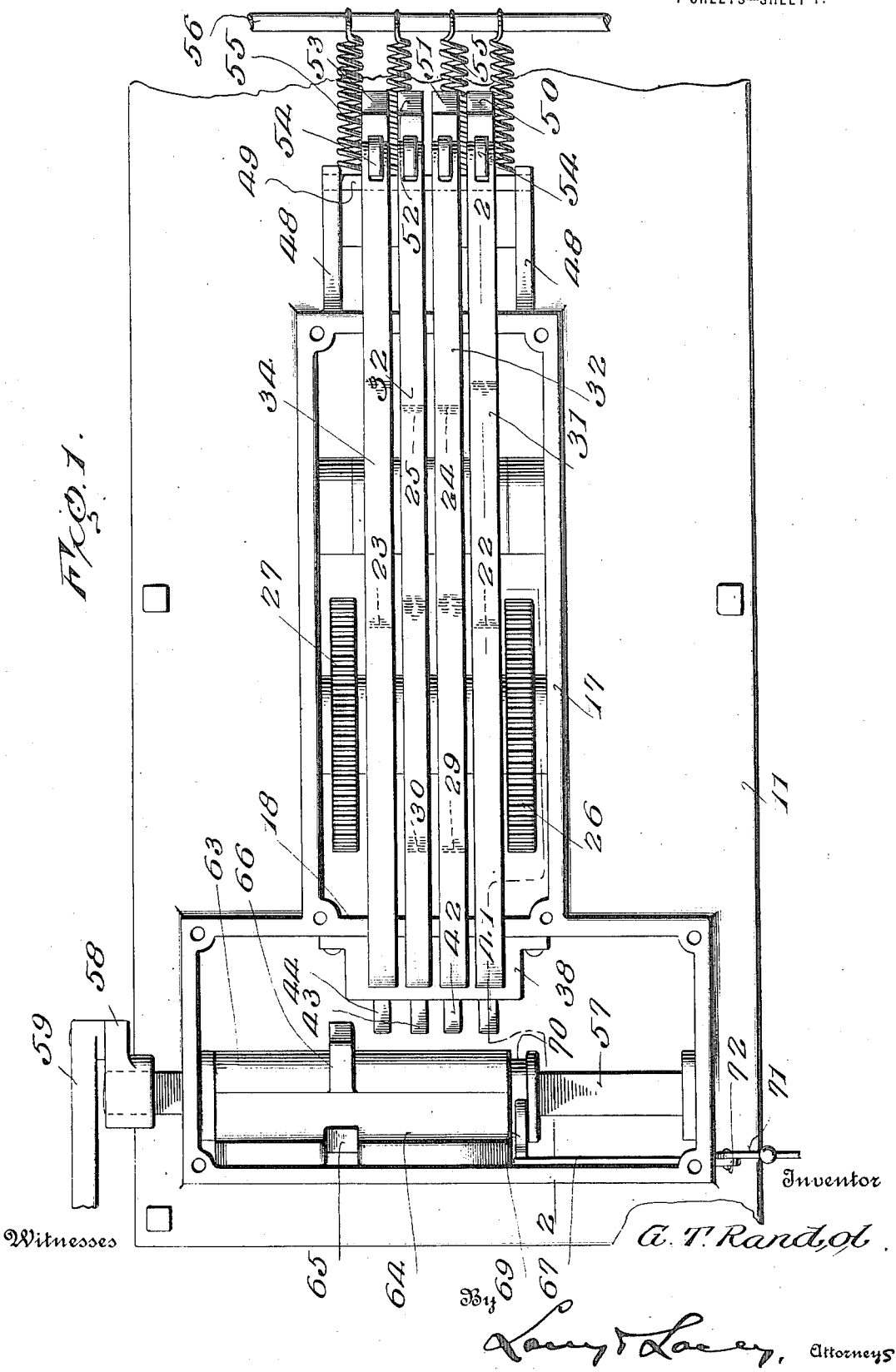

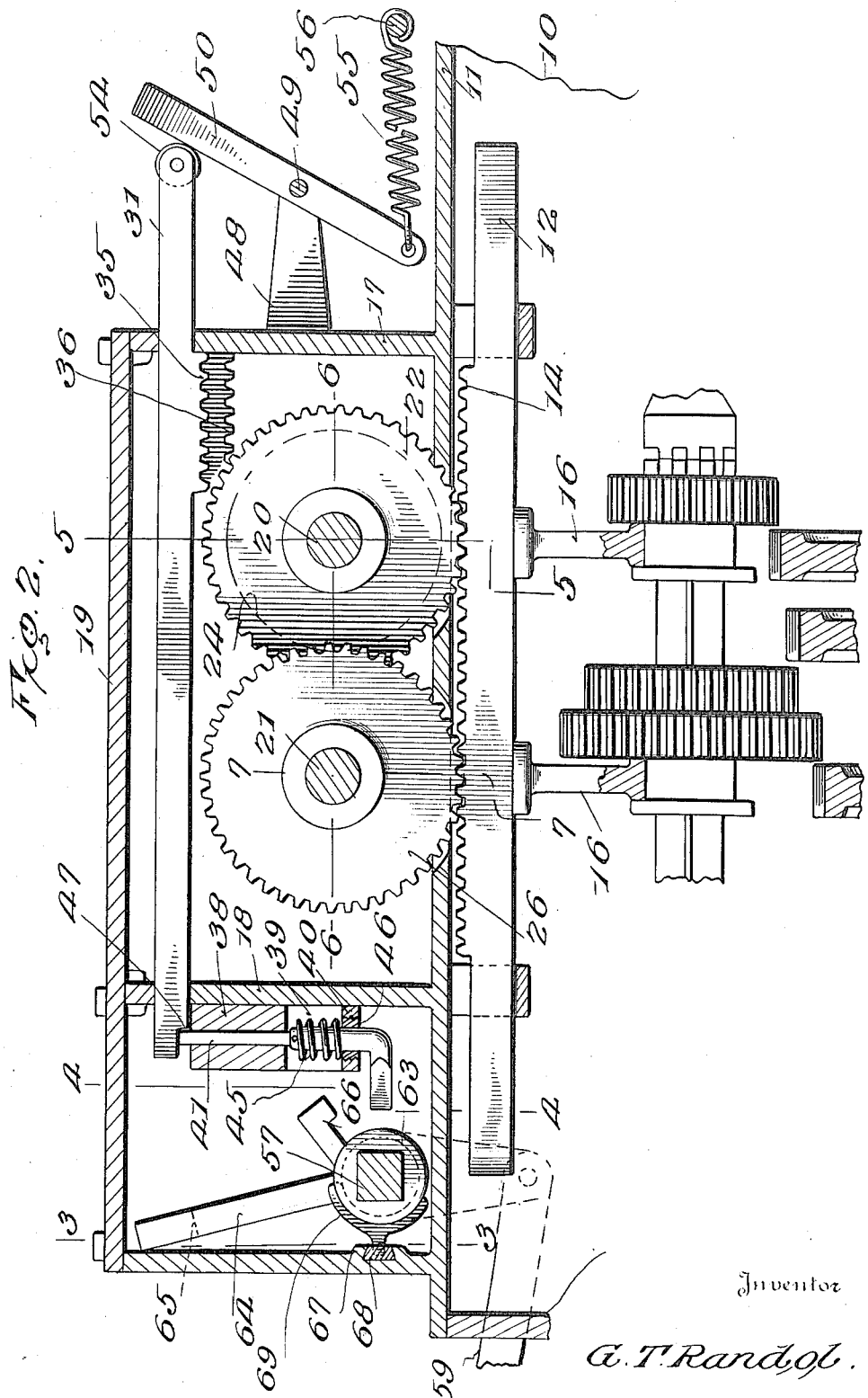

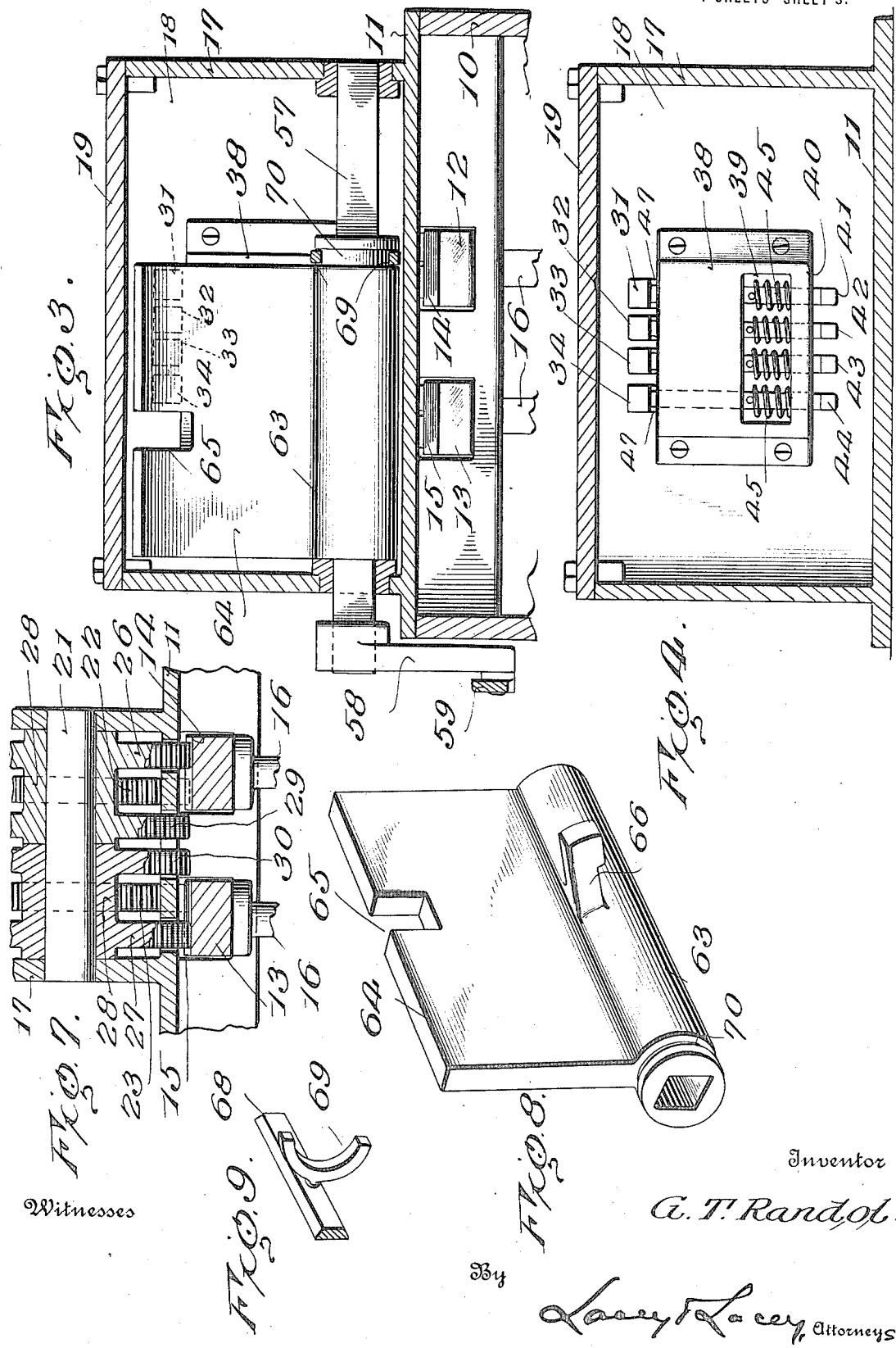

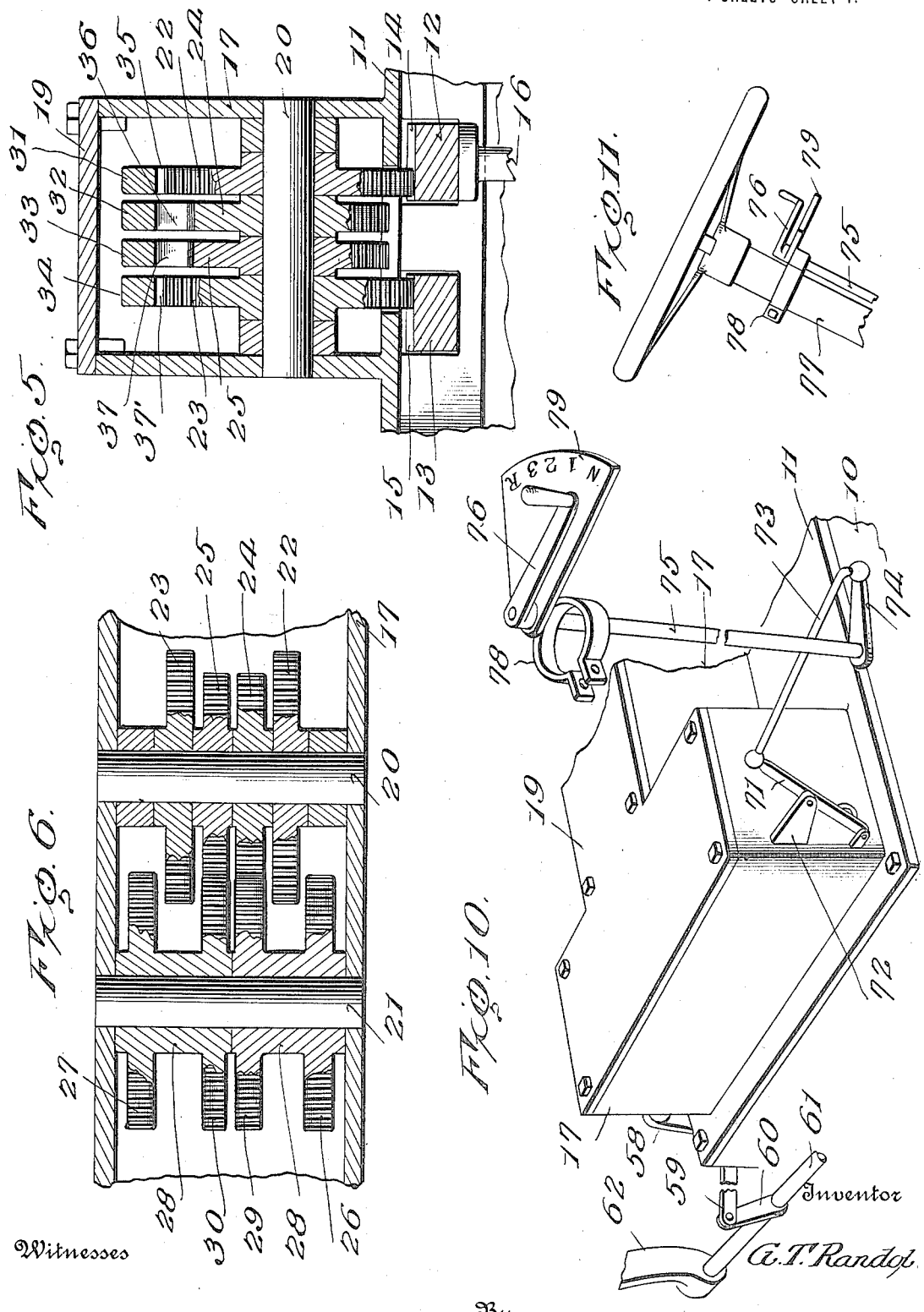

GLENN T. RANDOL, OF MARMADUKE, ARKANSAS.

MECHANICAL GEAR-SHIFT.

1,300,874.  Specification of Letters Patent.  Patented Apr. 15, 1919.

Application filed February 16, 1918. Serial No. 217,668.

*To all whom it may concern:*

Be it known that I, GLENN T. RANDOL, citizen of the United States, residing at Marmaduke, in the county of Greene and State of Arkansas, have invented certain new and useful Improvements in Mechanical Gear-Shifts, of which the following is a specification.

This invention relates to an improved mechanical gear shift for motor vehicles and has as its primary object to provide a mechanism which may be set to shift a selected gear and which will, upon the depression of the clutch pedal of the vehicle, automatically shift the gear so selected.

The invention has a further object to provide a mechanism wherein any gear previously in mesh will be shifted to neutral position prior to the shifting of the selected gear so that it will be impossible for any two of the speed gears to be in mesh at the same time.

A still further object of the invention is to provide a mechanism wherein it will be impossible to shift the gears when power is applied thereto, depression of the clutch being, in all instances, necessary to shift the selected gear so that likelihood of stripping of the gears will be overcome.

And the invention has as a still further object to provide a mechanism which will effect a noiseless, smooth and quick shifting of the gears so that the change from one speed gear to another may be easily made without tendency toward grinding of the gears and without jolting of the mechanism.

Other and incidental objects will appear as the description proceeds, and in the drawings wherein I have illustrated the preferred embodiment of the invention, and wherein similar reference characters designate corresponding parts throughout the several views:

Figure 1 is a plan view of my improved gear shifting mechanism showing the cover plate for the casing of the mechanism removed and illustrating the mechanism in connection with a transmission case, Fig. 2 is a fragmentary longitudinal sectional view taken on the line 2—2 of Fig. 1, particularly showing the arrangement of the mechanism upon the transmission case, Fig. 3 is a fragmentary vertical sectional view taken on the line 3—3 of Fig. 2, particularly showing the arrangement of the selector of the mechanism, Fig. 4 is a fragmentary sectional view taken on the line 4—4 of Fig. 2 and showing the catches employed for holding the actuating bars of the mechanism set in retracted position, Fig. 5 is a fragmentary sectional view taken on the line 5—5 of Fig. 2, showing certain of the gears employed for actuating the gear shift rods, Fig. 6 is a fragmentary horizontal sectional view taken on the line 6—6 of Fig. 2, particularly illustrating the arrangement of the shift gears of the mechanism, Fig. 7 is a fragmentary vertical sectional view taken on the line 7—7 of Fig. 2, illustrating the engagement between the shift gears of the mechanism and the gear shift rods of the transmission case, Fig. 8 is a detail perspective view of the selector, Fig. 9 is a fragmentary detail perspective view of the rod and fork employed for shifting the selector, Fig. 10 is a fragmentary perspective view showing the mechanism upon the transmission case and illustrating the control mechanism for actuating the selector, and Fig. 11 is a fragmentary side elevation showing the manner in which the control mechanism is mounted upon the steering post of the vehicle.

In order that the construction, mounting and operation of my improved mechanism may be accurately understood, I have, in the drawings, shown the said mechanism in connection with the transmission mechanism of a conventional type of motor vehicle. Such transmission mechanism includes a transmission case 10 provided with a cover plate 11. Slidably mounted within the transmission case are the usual gear shift rods 12 and 13 which, for the purposes of the present invention, are formed upon their upper sides with racks 14 and 15. Depending from the said rods are arms 16 terminating in suitable forks engaging with certain of the speed gears of the transmission mechanism. Only a portion of such gears have been shown since the specific character thereof does not concern the present structure. However, it should be stated that these gears are of such nature that by shifting the rod 12 rearwardly the low speed gear will be brought into action while by shifting this rod forwardly the reverse speed gear will be brought into action. In like manner, forward shifting of the rod 13 will bring the second speed gear into action while reverse shifting of this rod will bring the high speed gear into action. Thus the said rods are reciprocable in opposite directions for shifting all of the various speed gears and, of course, the said rods normally stand with the gears in neutral position.

In carrying out the invention I employ a casing 17 which is arranged to extend longitudinally of the transmission case 10 and is formed integral with the cover plate 11 of the said case or otherwise connected thereto. At its front end the casing 17 is laterally enlarged and this laterally enlarged portion of the casing is divided off from the rear portion thereof by a transverse partition 18. Closing the casing is a removable cover 19 secured in place by a plurality of bolts or other suitable fastening devices. Journaled between the side walls of the rear portion of the casing are spaced parallel shafts 20 and 21 respectively. Loosely mounted upon the shaft 20 are spaced gears 22 and 23 respectively which, as particularly shown in Fig. 5, project through a suitable opening in the cover plate 11 of the transmission case and engage the racks 14 and 15 of the rods 12 and 13 respectively. Loosely mounted upon the shaft between these gears are gears 24 and 25 respectively, of less diameter than the gears 22 and 23. Loosely mounted upon the shaft 21 are gears 26 and 27 respectively which, as particularly shown in Fig. 7, extend through a suitable opening in the transmission case cover 11 and also engage with the racks 14 and 15 of the rods 12 and 13 respectively, these racks being of a width sufficient to accommodate these latter gears. The gears 26 and 27 are formed with sleeves 28 and extending from the inner ends of these sleeves are gears 29 and 30 respectively, which are thus connected with the gears 26 and 27 to respectively turn therewith and are arranged to mesh with the gears 24 and 25. Slidably mounted through the rear end wall of the casing 17 and partition 18 are a plurality of parallel horizontally arranged actuating bars 31, 32, 33 and 34 respectively. The bar 31 is formed, upon its lower side, with a rack 35 to coöperate with the gear 22. The bar 32 is formed with an extension rack 36 to coöperate with the gear 24. The bar 33 is formed with a rack 37 similar to the rack 36 to coöperate with the gear 25, while the bar 34 is formed with a rack 37 similar to the rack 35 to coöperate with the gear 23. Normally these several bars are, as particularly brought out in Fig. 2, so disposed that the racks thereof are out of engagement with the gears 22, 23, 24 and 25, to allow free movement of the said gears. Consequently, it will be seen that by shifting the bar 31 forwardly, the rack 35 of the said bar will be caused to engage the gear 22 for rotating the said gear forwardly and consequently shifting the gear shift rod 12 rearwardly and thus render the low speed gear active. Since the gear 26 is also engaged with the rack of the rod 12, this gear as well as the gears 29 and 24, will be rotated idly by the said rod when thus shifted by the gear 22. Forward movement of the bar 32 will cause the rack 36 thereof to rotate the gear 24 forwardly which will then act through the gear 29 to rotate the gear 26 rearwardly. Rearward movement of this latter gear will consequently act through the rack 14 of the gear shift rod 12 to shift this rod forwardly and consequently render the reverse speed gear active. In like manner forward movement of the bar 33 will cause the rack 36 thereof to rotate the gear 25 forwardly to cause a rearward rotation of the gear 30 and a consequent rearward rotation of the gear 27 which latter gear will act upon the rack 15 of the gear shift rod 13 to shift this rod forwardly to render the second speed gear active, while forward movement of the bar 34 will cause its rack 37 to rotate the gear 23 forwardly so that this gear by its engagement with the rack 15 of the rod 13 will shift said rod rearwardly to render the high speed gear active. When the rod 13 is so moved rearwardly by the gear 23 such rod will, of course, by being engaged by the gear 27, idly rotate this gear as well as the gears 30 and 25. Thus, the several actuating rods are adapted to coöperate with the gears 22, 23, 24 and 25 upon being shifted forwardly, for selectively shifting all of the speed gears.

Connected, as particularly shown in Fig. 4, to the front side of the partition 18 is a block 38 provided with an opening 39 defining a strip 40 at the lower side of the block. Slidable vertically through this block is a plurality of catches indicated at 41, 42, 43 and 44 respectively. These catches are, as particularly shown in Fig. 2, provided with squared upper extremities for holding the said catches against rotation upon the block and at their lower extremities are formed with laterally directed terminals projecting forwardly from the block and having their outer extremities also squared. Surrounding the lower extremities of the catches within the opening 39 of the block are springs 45, the upper ends of which are arranged for engagement with suitable pins removably fitted through the catches while the lower ends of the said springs are engaged by collars 46 loosely surrounding the lower extremities of the catches and adjustable upon the strip 40 of the block for tensioning the said springs. As particularly brought out in Fig. 4, the catches 41, 42, 43 and 44 are arranged immediately beneath the forward ends of the actuating bars 31, 32, 33 and 34 and are constantly urged by the springs 45 to respectively coöperate therewith. The actuating bars are, at their forward lower corners, provided with suitable notches 47 for receiving the upper terminals of the catches so that these catches will act to normally lock the said bars against forward longitudinal movement. Extending from the rear end of the casing 17, at opposite sides thereof, are rearwardly projecting parallel arms 48 between the outer ends of which is mounted a shaft 49. Mounted to swing upon this shaft are a plurality of actuating levers 50, 51, 52 and 53 respectively, arranged to coöperate at their upper ends with the rear ends of the actuating bars 31, 32, 33 and 34. The rear terminals of these bars are, as particularly shown in Fig. 1, preferably equipped with rollers 54 for engagement by the levers to reduce friction between the bars and the levers. As also best shown in this figure, the said levers are offset with respect to each other or spread at their lower extremities to accommodate helical springs 55 engaged at their inner ends with the lower terminals of the said levers and at their outer ends with a suitable transverse rod 56 mounted upon some convenient portion of the frame of the vehicle. The springs 55 are of the contractile type and will thus act upon the levers 50, 51, 52 and 53 to constantly tend to shift the said bars forwardly against the action of the catches 41, 42, 43 and 44 locking the bars in normal position.

Journaled through the side walls of the forward portion of the casing 17 adjacent the bottom of the said casing is a transverse squared shaft 57. This shaft is extended at one end laterally from the casing and receives a depending crank 58 to which is pivotally connected at one end a link 59, the opposite end of which is, as particularly shown in Fig. 10, connected to an arm 60 upstanding from the clutch pedal shaft 61 of the vehicle. This clutch pedal shaft has been conventionally shown for convenience and has been illustrated as equipped with a suitable clutch pedal 62. As will be clear, depression of the clutch pedal for releasing the clutch of the vehicle will act through the arm 60, link 59 and crank 58, to rotate the shaft 57. Slidable upon the shaft 57 within the forward portion of the casing and mounted to turn with the said shaft is a selector 63, shown in detail in Fig. 8 of the drawings. Projecting radially and upwardly from the hub of the selector is a relatively wide neutral shifting lever or wing 64 arranged to confront the forward ends of the actuating bars 31, 32, 33 and 34, and of a width to always overlie all of the said levers without regard to the position of the selector longitudinally upon the shaft 57. This lever or wing is provided in its upper edge with a notch 65 adapted to freely receive the forward extremity of any one of the actuating bars therethrough. Projecting radially from the hub of the selector at an acute angle to the lever or wing 64 is a detent or trip 66 arranged in a plane with the notch 65. This detent is adapted to selectively engage the forwardly directed lower terminals of the catches 41, 42, 43 and 44 for releasing the said catches and consequently selectively freeing the actuating bars.

Formed on the front wall of the casing 17 to extend transversely of the inner side thereof is a guideway 67. This guideway is disposed in a plane with the shaft 57 and the inner walls thereof are beveled to slidably receive a control rod 68 to which is secured, as shown in detail in Fig. 9, a fork 69. This fork is mounted to project inwardly from the said rod and is arranged to loosely engage with a flange collar 70 formed upon the adjacent end of the hub of the selector. Consequently, the selector may rock with the shaft 57 while by actuating the control rod 68 the said selector may be positioned longitudinally upon the said shaft. At one end the rod 68 is arranged to project freely through the adjacent side wall of the casing, and, as particularly shown in Fig. 10, is engaged by a rock arm 71 pivotally mounted upon a suitable bracket 72 projecting laterally from the casing. Pivotally connected at one end with the arm 71 is a link rod 73, the opposite end of which is pivotally connected with a crank 74 upon the lower end of a vertical shaft 75 carrying at its upper end an arm or handle 76. As shown in detail in Fig. 11, the shaft 75 is preferably arranged to extend longitudinally of the steering post of the vehicle, such post being conventionally shown at 77, and is connected to the said post by a suitable clip 78. Associated with the upper end of the shaft 75 is a plate 79 lying beneath the handle 76 and bearing suitable indicia indicating proper adjustments of the handle for selecting different speed gears as well as for positioning the gears in neutral. As will be seen, swinging of the handle 76 will rotate the shaft 75 and act through the crank 74, link 73 and rock arm 71 to reciprocate the control rod 68 for positioning the selector upon the shaft 57.

The clutch pedal 62 is, as is usual, yieldably returned to and held in its normal position so that the selector 63 will, as will be understood in view of the preceding description, be yieldably returned to and normally held in position, as shown in Fig. 2, with its wing or lever 64 inclining toward the front wall of the casing 17 away from the forward ends of the actuating bars 31, 32, 33 and 34. Taking the position of the selector shown in Fig. 3, it will be assumed that it is desired to shift the low speed gear for rendering such gear active. To accomplish this result, the mechanism is first set by manually positioning the handle 76 opposite the numeral 1 upon the plate 79. Such movement of this handle will, as will also be understood in view of the preceding description, slide the selector along the shaft 57 to a position with the notch 65 of the lever or wing 64 of the said selector disposed opposite the forward end of the actuating bar 31 when the detent or trip 66 of the said selector will be disposed to travel in a path for engagement with the forwardly directed terminal of the catch 41. The clutch pedal 62 is then depressed for releasing the clutch of the vehicle when the selector will be rocked rearwardly upon the shaft 57 to consequently bring the said detent into engagement with the said terminal of the catch 41 and depress the said catch to release the actuating bar. Immediately upon such release, the said bar will, as previously described, be quickly projected forwardly by its lever 50, through the notch 65 for shifting the low speed gear. In like manner, should it be desired to shift any of the other speed gears, the handle 76 is operated to properly position the selector along the shaft 57 with respect to the actuating bars 32, 33 and 34. For shifting the reverse speed gear, the selector will be set in position with the notch 65 of its lever or wing 64 disposed opposite the forward end of the bar 32. For shifting the second speed gear, the selector will occupy a position with its notch 65 disposed opposite the forward end of the bar 33, while for shifting the high speed gear the said selector will be disposed in position with its notch arranged opposite the forward end of the bar 34. In each instance, it will, of course, be understood that when the selector is arranged with the notch 65 opposite any one of these bars, the trip 66 of the said selector will be disposed to engage a corresponding one of the catches 42, 43, and 44 for releasing the said bar when the clutch pedal is depressed. Thus, it will be seen that by positioning the selector by means of the handle 76, the mechanism may be set to select any desired speed gear when, upon actuation of the clutch pedal of the vehicle, the speed gear so selected will be automatically shifted. Since the shifting of the speed gears is directly accomplished by means of the springs 55 acting upon the several actuating bars through the medium of the levers 50, 51, 52, and 53, any speed gear selected will, upon the release of the actuating bar controlling the shifting of said gear, be quickly and smoothly shifted without noise and with a minimum tendency toward grinding of the gears or jolting of the mechanism. However, the springs 55 are only of such strength that while the said springs will shift the gears without pause in the shifting movement, the said springs will not pound the speed gears one against the other when shifted.

Assuming that one speed gear has been shifted as, for instance, the low speed gear, and the actuating bar 31 is accordingly projected forwardly, it will be further assumed that it is desired to shift from the low speed gear to the reverse speed gear. To accomplish this result the selector is moved along in front of the projected forward end of the bar 31, in the manner previously described, to a position with the notch 65 of the lever or wing 64 of the said selector disposed opposite the forward end of the actuating bar 32. In this position of the selector the imperforate portion of the said wing or lever will be brought opposite the forward end of the bar 31. Consequently, when the clutch pedal is depressed, the said selector will, as it is rocked forwardly to release the catch 42 of the bar 32 to permit the shifting of the reverse speed gear, engage the forward end of the bar 31 and shift this bar rearwardly against the tension of its spring 55. Rearward movement of the bar 31 will, of course, shift the low speed gear to neutral position and the trip 66 and lever 64 of the selector are so disposed with respect to each other that the said lever will be rocked to complete the rearward shifting of the bar 31 to be engaged by its catch 41 and consequently complete the shifting of the low speed gear to neutral position before the said trip is moved to engage the catch 42 of the bar 32 controlling the reverse speed gear. Thus, the low speed gear will be rendered inactive before the second speed gear is shifted. In like manner, when changing from any one of the speed gears to another, the gear previously active will, since the wing or lever 64 of the selector is of a width to overlie the forward ends of all of the actuating bars without regard to the position of the said selector along the shaft 57, be moved to neutral position before the proper catch is released to permit the shifting of the selected gear, the actuating bar of the speed gear previously active being moved rearwardly, in the manner just described, for shifting such previously active gear to neutral position as the selector is rocked rearwardly to release the catch of the selected gear. Consequently, no two of the speed gears can be in mesh at the same time. Likelihood of stripping of the gears is thus avoided while the change from one speed gear to another may be easily made. Furthermore, since the speed gears can be shifted only by depressing the clutch pedal it will be impossible to shift any speed gear when power is applied thereto. Attention is now directed to the fact that since the lever or wing 64 of the selector is adapted to shift the actuating bars rearwardly, the selector also provides a means for resetting the said bars while the said lever or wing provides a neutral shift lever adapted to act upon the actuating bars for shifting the speed gears to neutral position. In this connection it is to be noted that when any one of the speed gears is active and the actuating bar therefor is projected forwardly, depression of the clutch pedal, in the usual operation of the vehicle, will not serve to affect the position of the said gear so long as the selector is not positioned to select another speed gear. For instance, assuming the low speed gear to have been shifted so that the selector would then be arranged in position with the notch 65 of the lever or wing 64 thereof disposed opposite the forward end of the actuating bar 31, it will be seen that when the clutch was depressed in the operation of the vehicle, the forward end of the said bar would be received through the said notch upon rearward movement of the lever or wing of the selector under the influence of the said pedal. Consequently, the vehicle could be freely operated without affecting the position of the said speed gear and, of course, like condition would hold true in connection with the other speed gears. When desired to attain a neutral position of all of the speed gears, the selector is moved to the position shown in Fig. 3 of the drawings, so that any one of the speed gears previously active may be shifted to neutral position without releasing any of the other speed gears.

Having thus described the invention, what is claimed as new is:

1. A speed gear shifting mechanism including companion actuating means normally tending to shift the different speed gears, tripping means adapted to be set to release the said first mentioned means selectively for shifting a selected gear and movable upon the actuation thereof for shifting any previously selected gear to neutral position, and means for actuating the said second mentioned means.

2. A speed gear shifting mechanism including companion actuating means tending to shift the different speed gears and normally held set, tripping means adapted to be set for releasing the said first mentioned means selectively to shift a selected gear and movable upon the actuation thereof to reset any of the said first mentioned means previously released, and means for actuating said second mentioned means.

3. A speed gear shifting mechanism including companion actuating bars, rotatable means between certain of the bars and certain of the speed gears for shifting the said gears in a direction opposite to the movement of the said bars, rotatable means between certain other of the said bars and certain other of the speed gears for shifting such latter gears in a direction with such latter of the said bars, means acting upon all of the said bars for shifting the speed gears, means normally restraining the bars, means adapted to be set for releasing the said restraining means selectively for shifting a selected gear, and means for actuating said last mentioned means.

4. A speed gear shifting mechanism including companion actuating means normally tending to shift the different speed gears, pivoted tripping means slidable to be set for selecting any one of the speed gears and pivotally movable for first shifting any of the speed gears previously active to neutral position and then releasing a proper one of the said first mentioned means for shifting the gear selected, and means for pivoting the said last mentioned means.

5. A speed gear shifting mechanism including actuating bars projectable for shifting the different speed gears, means normally tending to project the said bars, catch members normally locking the said bars set in retracted position, pivoted tripping means slidable to be set for selecting any one of the speed gears and pivotally movable to first reset any one of the actuating bars previously projected for shifting any gear previously active to neutral position and then engaging a proper one of the said catch members for releasing a corresponding actuating bar to shift the gear selected.

6. A speed gear shifting mechanism including actuating bars projectable to shift the different speed gears, means normally tending to project the said bars, catch members normally holding the bars set in retracted position, and a selector adapted to be set to control the shifting of the said gears, the said selector including a trip adapted to selectively coöperate with said catch members, and a wing extending in front of said bars and provided with a notch adapted to freely receive each of the bars and disposed in a plane with the said trip, the said selector being movable to engage the wing thereof with the bar controlling any gear previously selected for resetting such bar and then engaging the trip with a proper one of said catch members for releasing the actuating bar held thereby for movement through said notch to shift the gear selected.

7. A speed gear shifting mechanism including actuating means normally tending to shift the speed gears, tripping means having a tripping element and adapted to be set for releasing the actuating means by said element to shift a selected gear, and mechanical means for positively actuating said tripping means.

8. A speed gear shifting mechanism including actuating means for each of the speed gears tending to shift the gears and normally held set, tripping means adapted to be set for selectively releasing the actuating means to shift a selected gear, and means for actuating the tripping means, said tripping means when actuated being adapted to simultaneously reset the actuating means controlling any speed gear previously shifted.

9. A speed gear shifting mechanism including actuating means for each of the speed gears tending to shift the gears, tripping means adapted to be set for selectively releasing the actuating means to shift a selected gear, and means for actuating the tripping means, said tripping means when actuated being adapted to coöperate with the actuating means controlling a gear previously shifted for shifting such previously shifted gear to neutral position.

10. A speed gear shifting mechanism including companion actuating means normally tending to shift the different speed gears, a common mechanical tripping means having a tripping element and adapted to be set for releasing all of the said first mentioned means by said element selectively to shift a selected gear, and means for positively actuating the tripping means.

11. A speed gear shifting mechanism including companion actuating means normally tending to shift the different speed gears, pivoted tripping means shiftable to be set for selectively releasing the actuating means, and means for pivoting the tripping means for releasing the actuating means selected to shift a selected gear.

12. A speed gear shifting mechanism including actuating means operable for automatically shifting the speed gears, means normally holding the actuating means set, pivoted tripping means slidable to be set for selectively releasing said second mentioned means, and means for pivoting the tripping means to release the said second mentioned means selected for shifting a selected gear.

13. A speed gear shifting mechanism including actuating bars operatively connected with the different speed gears and normally tending to shift the gears, pivoted tripping means slidable with respect to the bars for selecting the bar of a desired speed gear, and means for pivoting the tripping means to release the selected bar for shifting the speed gear selected.

14. A speed gear shifting mechanism including actuating bars operatively connected with the different speed gears and normally tending to shift said gears, catch members normally restraining the said bars, pivoted tripping means slidable with respect to the bars for selecting the bar of a desired speed gear, and means for pivoting the tripping means to engage and release the catch member of the bar selected for shifting the said gear.

15. A speed gear shifting mechanism including actuating bars urged to shift the different speed gears and normally held set, pivoted tripping means slidable to be set for selectively releasing said bars to shift a selected gear, and means for pivoting the tripping means to release the bar of the gear selected, the said tripping means when pivoted being adapted to engage any one of the bars previously released for resetting said bar.

16. A speed gear shifting mechanism including actuating bars normally tending to shift the different speed gears and projectable for shifting the said gears, and a pivoted selector slidable in front of the bars to be set for releasing the bar of a selected gear and pivotally movable for releasing said bar.

17. A speed gear shifting mechanism including actuating bars normally held set and projectable for shifting the speed gears, levers coöperating with the rear ends of the bars, yieldable means acting upon the levers for normally projecting the bars, and a selector slidable in front of the bars to be set for releasing the bar of a selected gear.

18. A speed gear shifting mechanism including actuating bars tending to shift the speed gears, catch members normally holding the bars set, and a pivoted selector including a trip adapted to selectively coöperate with the catch members, the selector being slidable to be set for releasing the catch member holding the bar of a selected gear and being pivotally movable to engage the trip with the said catch member for releasing the said bar for shifting the gear selected.

19. A speed gear shifting mechanism including companion actuating means tending to shift the speed gears and normally held set, and pivoted tripping means movable to selectively release the actuating means to be received therethrough and simultaneously engage any actuating means previously released for resetting such previously released actuating means.

20. A speed gear shifting mechanism including actuating bars tending to shift the speed gears and normally held set, and a notched selector pivotally movable to selectively release said bars to be received through the notch thereof and simultaneously engage any bar previously released for resetting such bar.

21. A speed gear shifting mechanism including actuating bars tending to shift the speed gears and normally held set, a pivoted selector slidable transversely of the said bars to be set for releasing the bar of a selected gear, and means for pivoting the selector for releasing said bar.

22. A speed gear shifting mechanism included actuating bars tending to shift the speed gears, catch members normally holding the bars set, a pivoted selector provided with a notch, a trip carried by the selector, the selector being slidable for positioning the trip to engage the catch member of the bar controlling a selected gear, and means for pivoting the selector for releasing said catch member and freeing said bar to be received through the notch of the selector, the selector, when pivoted, being adapted to engage and reset any bar previously released.

23. A speed gear shifting mechanism including spring pressed actuating bars normally held set, means for selectively releasing said bars, gear shift bars, and a gear connection between the actuating bars and the gear shift bars for moving certain of the gear shift bars with certain of the actuating bars and moving certain other of the gear shift bars in a direction opposite to the movement of certain other of the actuating bars.

24. A speed gear shifting mechanism including spring pressed actuating bars normally held set, means for selectively releasing said bars, gear shift bars operatively connected with the speed gears, gear elements engaged with the gear shift bars, certain of said gear elements being movable directly by certain of the actuating bars for shifting corresponding gear shift bars in a direction opposite to the movement of such of the actuating bars, and other gear elements movable by other of the actuating bars and forming an indirect connection between such other actuating bars and certain other of the gear shift bars for moving such other gear shift bars in a direction with the latter actuating bars.

25. A speed gear shifting mechanism including spring pressed actuating bars normally held set, means for selectively releasing said bars, gear shift bars operatively connected with the speed gears, compound gear elements having certain of the gears thereof engaged with certain of the gear shift bars, gears meshing with the free gears of said gear elements and movable by certain of the actuating bars, and other gears movable by certain other of the actuating bars and engaged with certain other of the gear shift bars.

26. In gear shifting mechanism, the combination with spring pressed companion actuating means normally held set and releasable selectively for shifting the speed gears, of tripping means for selectively releasing the actuating means and resetting any actuating means previously released.

27. A speed gear shifting mechanism including actuating means tending to shift the different speed gears and normally held set, and tripping means for releasing the actuating means and resetting said actuating means.

In testimony whereof I affix my signature.

GLENN T. RANDOL. [L. S.]